(12) United States Patent
Dubroy et al.

(10) Patent No.: US 11,036,986 B2
(45) Date of Patent: Jun. 15, 2021

(54) SYSTEMS AND METHODS FOR ALIGNING MAP DATA

(71) Applicant: Lyft, Inc., San Francisco, CA (US)

(72) Inventors: Patrick Dubroy, Munich (DE); Wolfgang Hess, Munich (DE); Clemens Marschner, Munich (DE); Emil Praun, Union City, CA (US); Holger Rapp, Munich (DE); Thomas Schiwietz, Munich (DE); Vinay Shet, Fremont, CA (US)

(73) Assignee: Lyft, Inc., San Francisco, CA (US)

( * ) Notice: Subject to any disclaimer, the term of this patent is extended or adjusted under 35 U.S.C. 154(b) by 201 days.

(21) Appl. No.: 16/271,526

(22) Filed: Feb. 8, 2019

(65) Prior Publication Data

US 2020/0257900 A1    Aug. 13, 2020

(51) Int. Cl.
| | |
|---|---|
| *G06K 9/00* | (2006.01) |
| *G06T 17/05* | (2011.01) |
| *G06T 7/70* | (2017.01) |
| *G06F 16/29* | (2019.01) |

(52) U.S. Cl.
CPC ......... *G06K 9/00671* (2013.01); *G06F 16/29* (2019.01); *G06K 9/00791* (2013.01); *G06T 7/70* (2017.01); *G06T 17/05* (2013.01); *G06T 2207/30256* (2013.01); *G06T 2207/30261* (2013.01)

(58) Field of Classification Search
CPC .................................................. G06K 9/00791
See application file for complete search history.

(56) References Cited

U.S. PATENT DOCUMENTS

| | | | |
|---|---|---|---|
| 2018/0188026 A1* | 7/2018 | Zhang | G01S 19/42 |
| 2018/0188045 A1* | 7/2018 | Wheeler | G06K 9/03 |
| 2019/0050648 A1* | 2/2019 | Stojanovic | G06T 11/60 |
| 2019/0271559 A1* | 9/2019 | Colgate | G01C 21/28 |
| 2020/0025935 A1* | 1/2020 | Liang | G06K 9/629 |
| 2020/0103236 A1* | 4/2020 | Adams | G01C 21/3626 |

* cited by examiner

*Primary Examiner* — Ross Varndell
(74) *Attorney, Agent, or Firm* — Sheppard Mullin Richter & Hampton LLP

(57) ABSTRACT

Systems, methods, and non-transitory computer-readable media can receive a geometric map and a semantic map associated with a geographic area, the semantic map comprising semantic data associated with vehicle navigation. A first semantic position estimate associated with a first piece of semantic data contained in the semantic map is generated based on semantic data location information associated with the first piece of semantic data. A final position for the first semantic position estimate is received. One or more three-dimensional semantic labels are applied to the geometric map based on the final position of the first semantic position estimate. A warped semantic map is generated. Generating the warped semantic map comprises warping the semantic map based on the one or more three-dimensional semantic labels.

20 Claims, 16 Drawing Sheets

SYSTEMS AND METHODS FOR ALIGNING MAP DATA

FIELD OF THE INVENTION

The present technology relates to vehicle systems and navigation systems. More particularly, the present technology relates to systems, apparatus, and methods for warping and aligning map data that may be obtained from different sources.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to receive a geometric map and a semantic map associated with a geographic area, the semantic map comprising semantic data associated with vehicle navigation. A first semantic position estimate associated with a first piece of semantic data contained in the semantic map is generated based on semantic data location information associated with the first piece of semantic data. A final position for the first semantic position estimate is received. One or more three-dimensional semantic labels are applied to the geometric map based on the final position of the first semantic position estimate. A warped semantic map is generated. Generating the warped semantic map comprises warping the semantic map based on the one or more three-dimensional semantic labels.

In an embodiment, a set of image associated with the geometric map are received.

In an embodiment, the first semantic position estimate is applied to a first image of the set of images, and estimates a position of the first piece of semantic data within the first image.

In an embodiment, receiving the final position for the first semantic position estimate comprises: receiving a final two-dimensional position for the first semantic position estimate within the first image.

In an embodiment, receiving the final position for the first semantic position estimate comprises: receiving a user input adjusting a position of the first semantic position estimate within the first image.

In an embodiment, the receiving the final position for the first semantic position estimate comprises: adjusting a position of the first semantic position estimate within the first image using a machine learning model.

In an embodiment, applying one or more three-dimensional semantic labels to the geometric map based on the final position of the first semantic position estimate comprises translating the final two-dimensional position of the first semantic position estimate within the first image into a three-dimensional position within the geometric map.

In an embodiment, the final two-dimensional position of the first semantic position estimate within the first image is translated into a three-dimensional position within the geometric map based on image location information associated with the first image and camera information associated with the first image, wherein the camera information comprises camera position, orientation, and direction information for a camera when the first image was captured.

In an embodiment, the warping the semantic map based on the one or more three-dimensional semantic labels is performed as an optimization problem that warps the semantic map based on a set of constraints.

In an embodiment, the warped semantic map is layered on the geometric map.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1A:
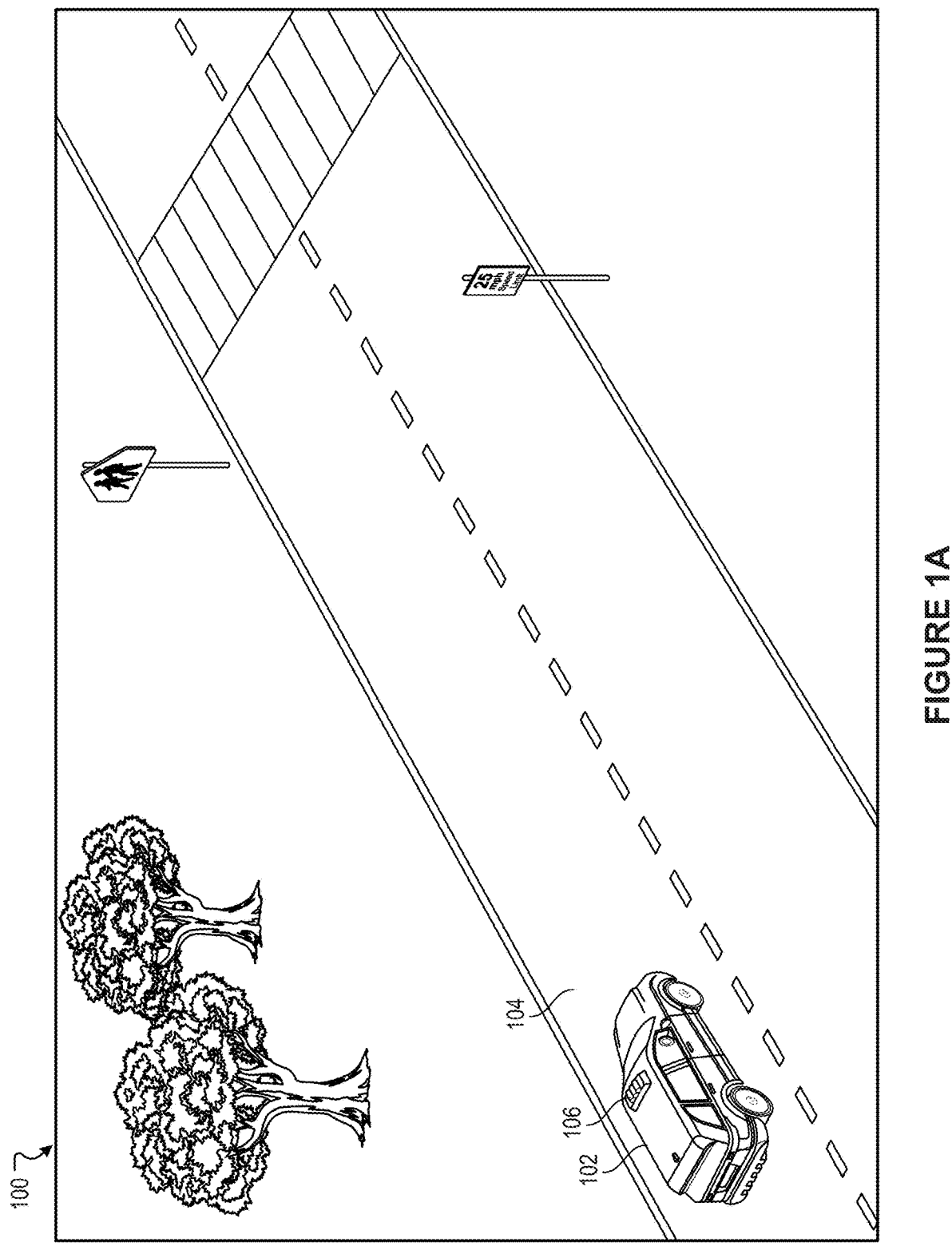
FIGS. 1A and 1B illustrate example scenarios demonstrating various challenges that may be experienced in conventional approaches to vehicle operation.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have one or more sensors or sensor systems that can recognize hazards, roads, lane markings, traffic signals, etc. Data from sensors may be used to, for example, safely drive the vehicle, activate certain safety features (e.g., automatic braking), and generate alerts about potential hazards.

Figure 1B:
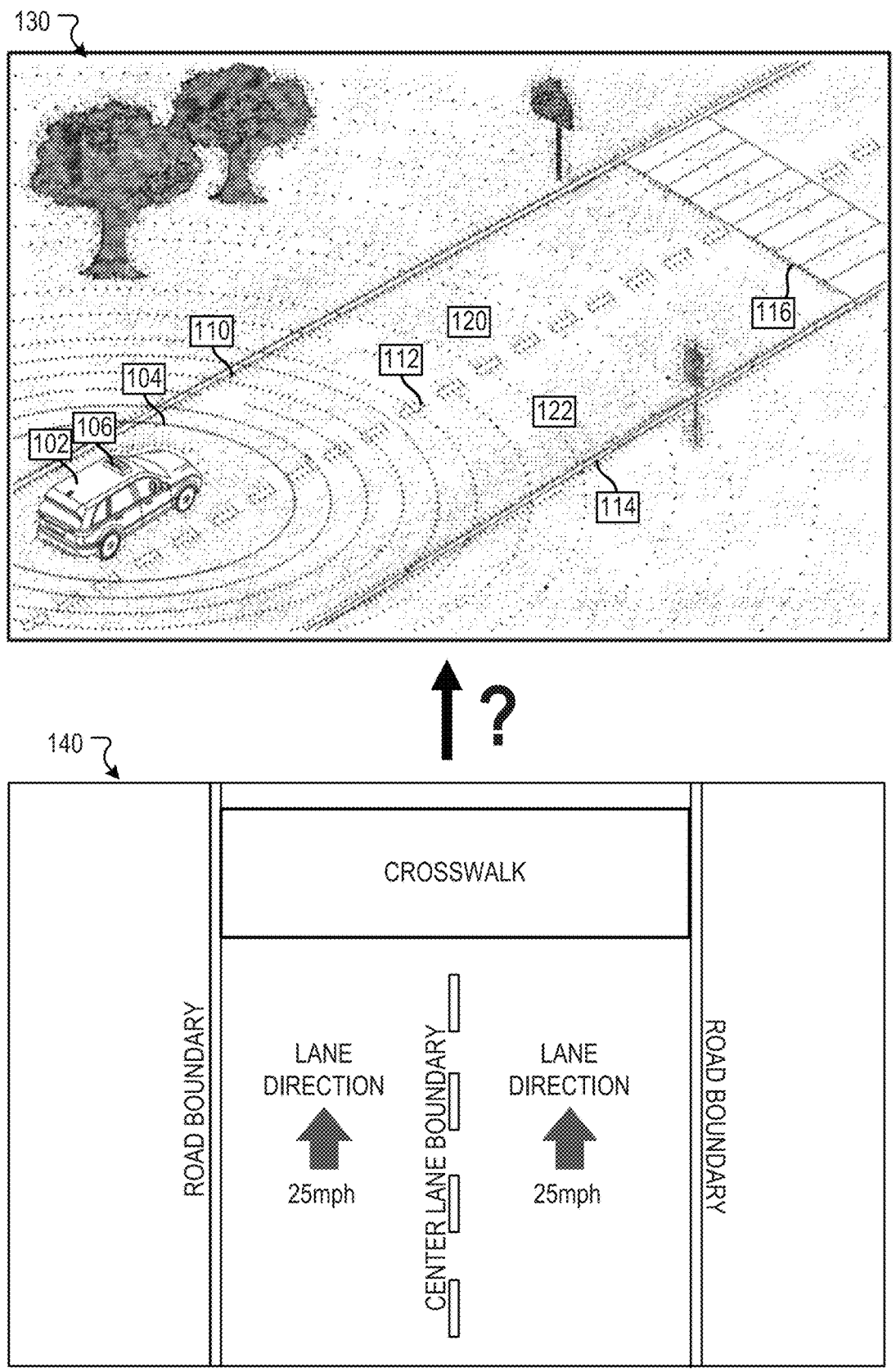
Figure 6:
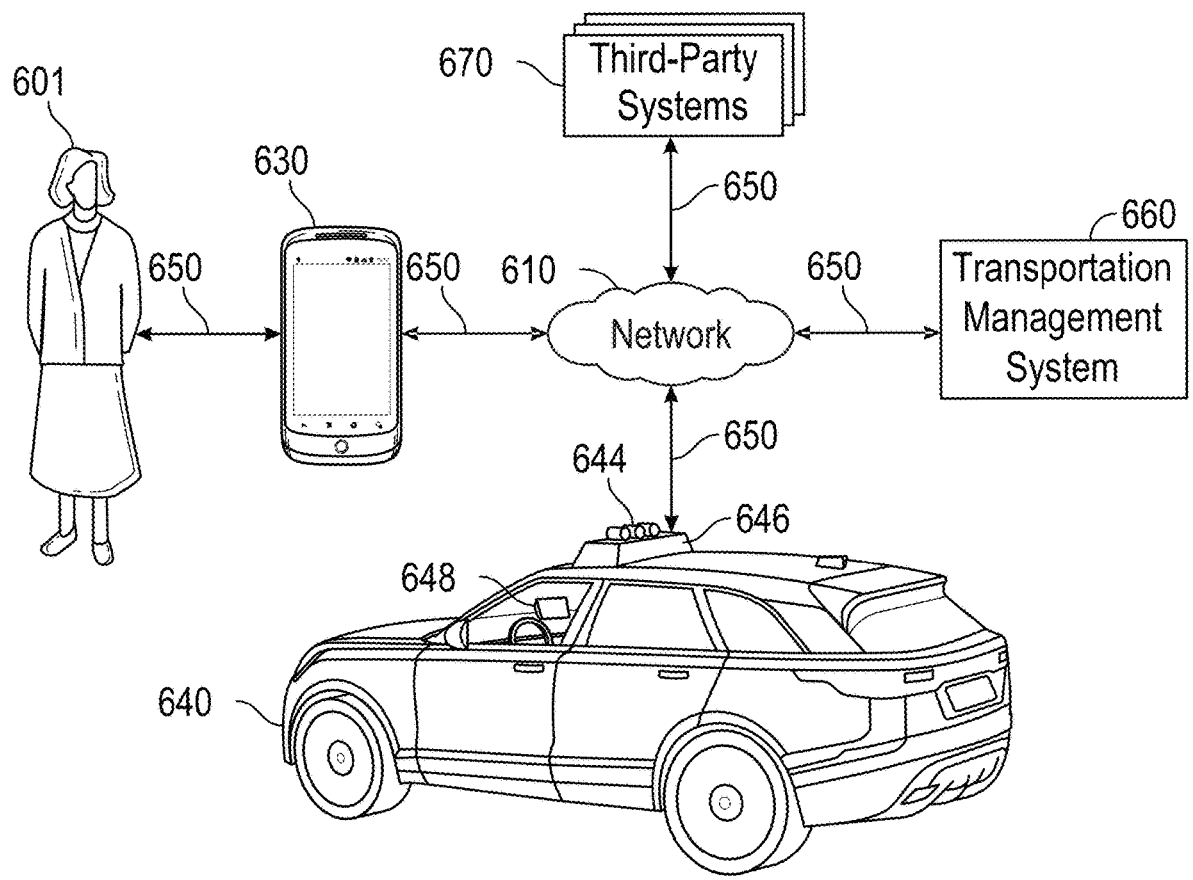
FIG. 6 illustrates an example block diagram of a transportation management environment, according to an embodiment of the present technology.

Vehicles typically rely on geometric maps of geographic locations for autonomous or semi-autonomous navigation. For example, a geometric map of a geographic location can include data pertaining to geometric features (e.g., physical features) that correspond to the geographic location. A geometric map may include, for example, positions and/or shapes of physical structures or objects or other physical features in a geographic location. A geometric map can be created based on sensor data (e.g., point cloud data, camera data, etc.) captured by a fleet of vehicles while navigating a geographic location. For example, FIG. 1A illustrates an example environment 100 being mapped by a vehicle 102 while navigating a road segment 104. The vehicle 102 can be, for example, a vehicle 640 as shown in FIG. 6. The vehicle 102 includes a sensor suite 106 that can be used to sense objects and/or features that are around (or within some threshold proximity of) the vehicle 102. In some embodiments, the collected information can include a three-dimensional representation of the environment 100 based on point cloud data captured by sensors (e.g., a lidar system) in the sensor suite 106. A top frame 130 in FIG. 1B presents an example of point cloud data that may be captured by the sensor suite 106 on the vehicle 102. As can be seen in FIG. 1B, the point cloud data identifies various physical features and their positions within the environment 100. The point cloud data in the frame 130 may be used to generate a geometric map.

However, in order to perform autonomous or semi-autonomous navigation, a vehicle requires information not only about the geometric, physical features in an area, but also contextual information about the physical features that may be contained in a geometric map. For example, in the example shown in the top frame 130 of FIG. 1B, a geometric map may indicate the position of the road segment 104 and/or the positions of various physical features, such as trees or signs proximate the road segment 104. However, in order to successfully navigate the road segment 104, the vehicle 102 also needs to know that the road segment 104 has two lanes 120, 122, the positions of boundary lines 110, 112, 114 defining the lanes 120, 122, the direction of travel in each lane 120, 122, the speed limit of the road segment 104, the fact that a crosswalk 116 crosses the road segment 104, the position of the crosswalk 116, and the like. Such contextual information may also be referred to as semantic information, or semantic data, and may be provided in a semantic map.

There are a number of third-party map providers that provide semantic data layers (e.g., road directions, traffic flow, speed limits, etc.) that can be used to help scale high-definition map generation for autonomous or semi-autonomous vehicles. However, under conventional approaches, it can be difficult to integrate third-party semantic maps with independently-created geometric maps because they may be captured and created using different sensor data at different levels of accuracy or detail, they may potentially have different reference points that may not align with one another, and/or they may potentially be warped in differing ways. For example, a bottom frame 140 in FIG. 1B presents a graphical representation of semantic data that may be contained in a semantic map. The semantic data shown in the bottom frame 140 pertains to the road segment 104 depicted in the top frame 130. The semantic data indicates the positions of road/lane boundaries, the position of a crosswalk, directions of travel in each lane, and speed limits in each lane. Such information can be useful for navigating the road segment 104. However, under conventional approaches, it may be difficult to integrate the semantic data in the semantic map (frame 140) into the corresponding geometric map (frame 130) for the reasons described above. Conventional approaches pose disadvantages in addressing these and other problems.

An improved approach in accordance with the present technology overcomes the foregoing and other disadvantages associated with conventional approaches. In various embodiments, the present technology can receive a geometric map and a semantic map associated with a geographic area. The geometric map may contain data describing physical characteristics of features in the geographic area. The geometric map may be generated, for example, using point cloud data captured by one or more lidar systems. The semantic map may contain semantic data about the geographic area. Semantic data may include, for example, positions and/or orientations of lane markers and boundaries, lane directions, speed limits, positions of road features such as stop lines, cross walks, traffic signal lines, lane markers, or any other semantic data that may be required to navigate a vehicle.

The semantic map can be warped in order to make semantic data contained within the semantic map align with and/or consistent with locations and positions of physical features in the geometric map. In order to warp the semantic map, one or more semantic position estimates can be generated which provide an initial estimate as to how semantic data in the semantic map fits on the geometric map. The semantic position estimates can be applied to and/or presented within two-dimensional images that are tightly coupled to the geometric map. For example, the two-dimensional images may be images captured by a camera mounted to a vehicle while a lidar system mounted to the vehicle captures lidar data, and the lidar data may be used to generate the geographic map. The two-dimensional images may be tightly coupled to the geometric map such that each image is associated with location information which identifies (or can be used to identify) a location within the geometric map from which the image was captured. Semantic data contained in the semantic map can also be associated with location information. Image location information associated with an image and semantic data location information associated with a particular piece of semantic data can be used to generate a semantic position estimate that estimates the position of the semantic data within the image. For example, a semantic map may identify the position and orientation of a first lane marker. A semantic position estimate can be applied to an image which estimates the position of the first lane marker within the image based on image location information associated with the image and semantic data location information associated with the first lane marker.

Semantic position estimates can be either confirmed (e.g., if the semantic position estimate correctly estimates the position of the semantic data within the image) or corrected (e.g., if the semantic position estimate incorrectly estimates the position of the semantic data within the image). For example, in the example above in which a semantic position estimate is generated within an image for a first lane marker, if the semantic position estimate correctly positions the lane marker over the position of the lane marker in the image, the semantic position estimate can be confirmed. However, if the semantic position estimate incorrectly positions the lane marker within the image, the semantic position estimate can be corrected, for example, by identifying the actual position of the lane marker in the image. Confirmation and/or correction of semantic position estimates may be performed manually (e.g., by an operator) or automatically (e.g., by a machine learning model). Confirmation and/or correction of a semantic position estimate causes one or more two-dimensional semantic labels to be applied to the two-dimensional image. Since the image is tightly coupled to the geometric map, the two-dimensional position of each two-dimensional semantic label within the image can be translated into a three-dimensional position within the three-dimensional geometric map. Three-dimensional semantic labels can be applied to the geometric map based on translation of the two-dimensional semantic labels into the geometric map. The semantic map can be warped based on the three-dimensional semantic labels applied to the geometric map. The warped semantic map can be overlaid on (e.g., layered on) the geometric map. As a result, a particular position in the geometric map can be used to access geometric, physical features relating to that position as well as relevant semantic data relating to that position within the geometric map. More details relating to the present technology are provided below.

Figure 2:
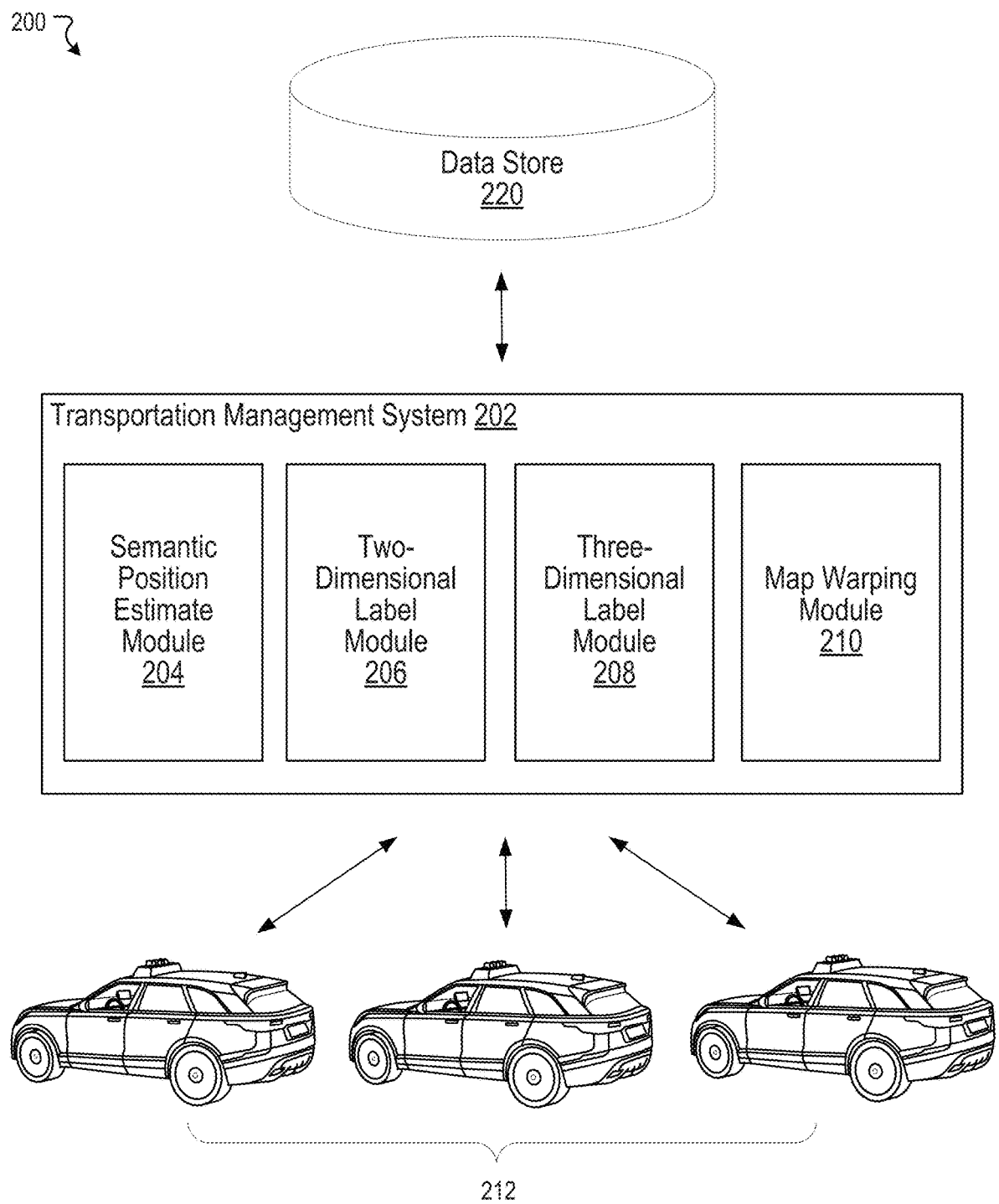
FIG. 2 illustrates an example transportation management system, according to an embodiment of the present technology.

FIG. 2 illustrates an example environment 200, according to an embodiment of the present technology. The environment 200 can include an example transportation management system 202 and a fleet of vehicles 212. The fleet of vehicles 212 may be managed by the transportation management system 202. The transportation management system 202 can be, for example, the transportation management system 660 of FIG. 6. The fleet of vehicles 212 can be, for example, a fleet comprised of one or more vehicles, such as the vehicle 640 of FIG. 6. As shown, the transportation management system 202 can include a semantic position estimate module 204, a two-dimensional label module 206, a three-dimensional label module 208, and a map warping module 210. In various embodiments, the transportation management system 202 can access sensor data collected by sensors of the fleet of vehicles 212 from various sources and geographic locations. For example, the transportation management system 202 can access sensor data from the fleet of vehicles 212 in real-time (or near real-time) over one or more computer networks. In another example, the transportation management system 202 can be configured to communicate and operate with at least one data store 220 that is local to the transportation management system 202. The at least one data store 220 can be configured to store and maintain various types of data, such as sensor data captured by the fleet of vehicles 212. In general, sensor data captured by the fleet of vehicles 212 (e.g., point cloud data, image data, video data, etc.) can provide three-dimensional representations of geographic locations. In some embodiments, some or all of the functionality performed by the transportation management system 202 and its sub-modules may be performed by one or more computing systems implemented in a vehicle, such as the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The semantic position estimate module 204 can be configured to receive a geometric map and a semantic map associated with a geographic area. The geometric map may contain data describing physical characteristics of the geographic area. The geometric map may be generated, for example, using point cloud data captured by one or more lidar systems. The semantic map may contain semantic data about the geographic area. Semantic data may include, for example, positions and/or orientations of lane markers and boundaries, lane directions, speed limits, positions of road features such as stop lines, cross walks, traffic signal lines, lane markers, or any other semantic data that may be required to navigate a vehicle.

The semantic position estimate module 204 can also receive one or more two-dimensional images that are associated with the geometric map. In an embodiment, the two-dimensional images may be tightly coupled to the geometric map such that each image is associated with image location information which can be used to identify a location within the geometric map from which the image was captured. The image location information associated with an image may also, in addition to identifying a position within the geometric map from which the image was captured, identify a geographic location from which the image was captured (e.g., GPS coordinates). Semantic data contained in the semantic map can also be associated with location information (i.e., semantic data location information). For example, semantic data may be associated with GPS information identifying geographic locations for semantic data in the semantic map. For example, a first piece of semantic data may identify a segment of a lane marker, and semantic data location information associated with that first piece of semantic data may indicate a geographic location of the lane marker segment. Although various examples described herein will focus on lane markers and lane identification semantic data, the present technology may be applied to many different types of semantic data pertaining to vehicle navigation.

The semantic position estimate module 204 can generate a semantic position estimate that maps semantic data in the semantic map into a two-dimensional image (e.g., a two-dimensional image captured by a camera). Mapping of semantic data into a two-dimensional image and generation of semantic position estimates may be performed based on semantic data location information and image location information. For example, a first piece of semantic data may identify and/or describe a first physical feature (e.g., a lane marker segment). Semantic data location information for the first piece of semantic data may indicate a geographic location for the first physical feature. Similarly, image location information for a first image may indicate a geographic location from which the first image was captured. Using this information, in conjunction with camera information indicative of an angle of view, a position, an orientation, and/or a direction of a camera when the first image was captured, the position of the first physical feature within the first image can be estimated.

Figure 3A:
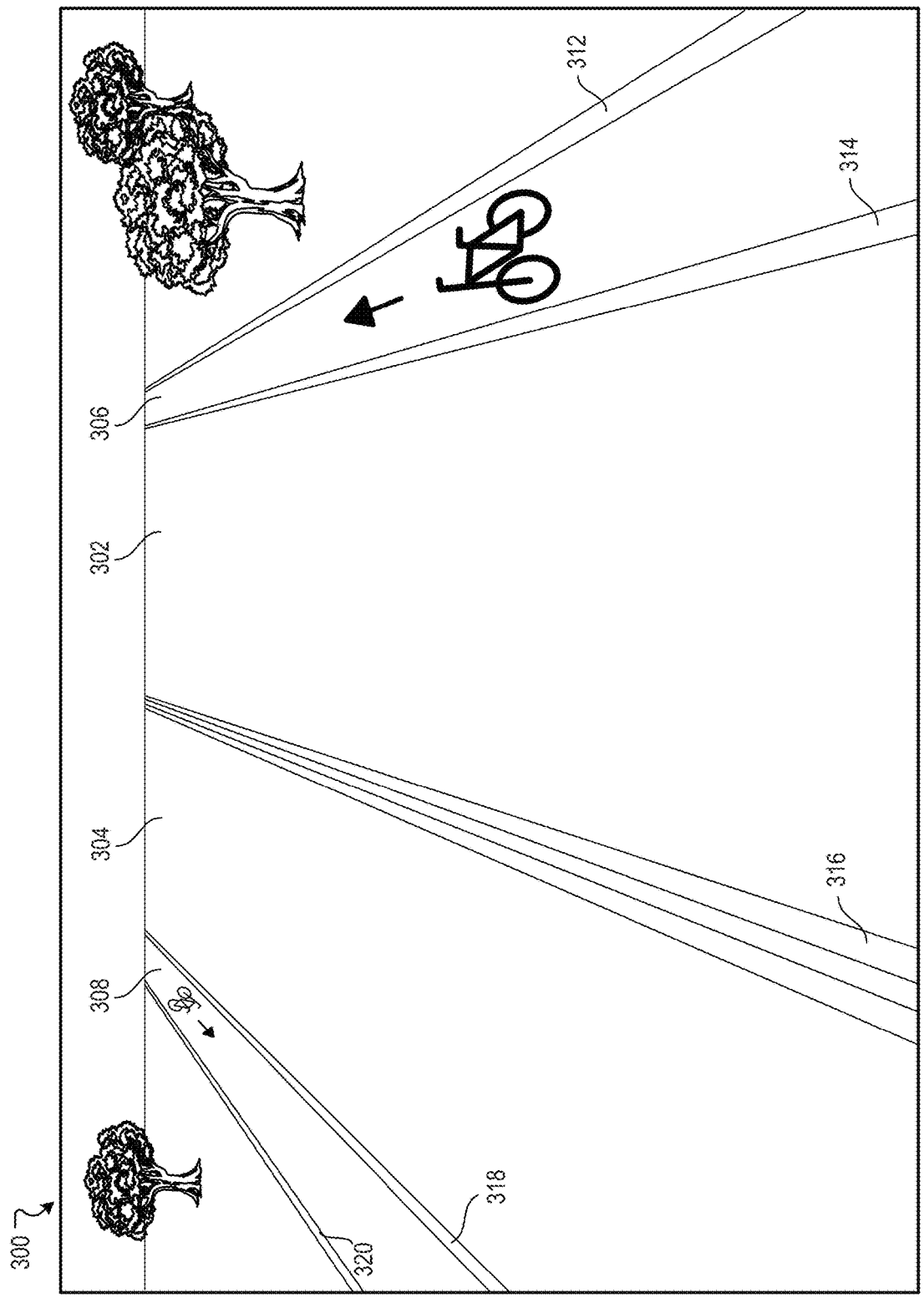
FIGS. 3A-C illustrate an example scenario demonstrating labeling of images, according to an embodiment of the present technology.
Figure 3B:
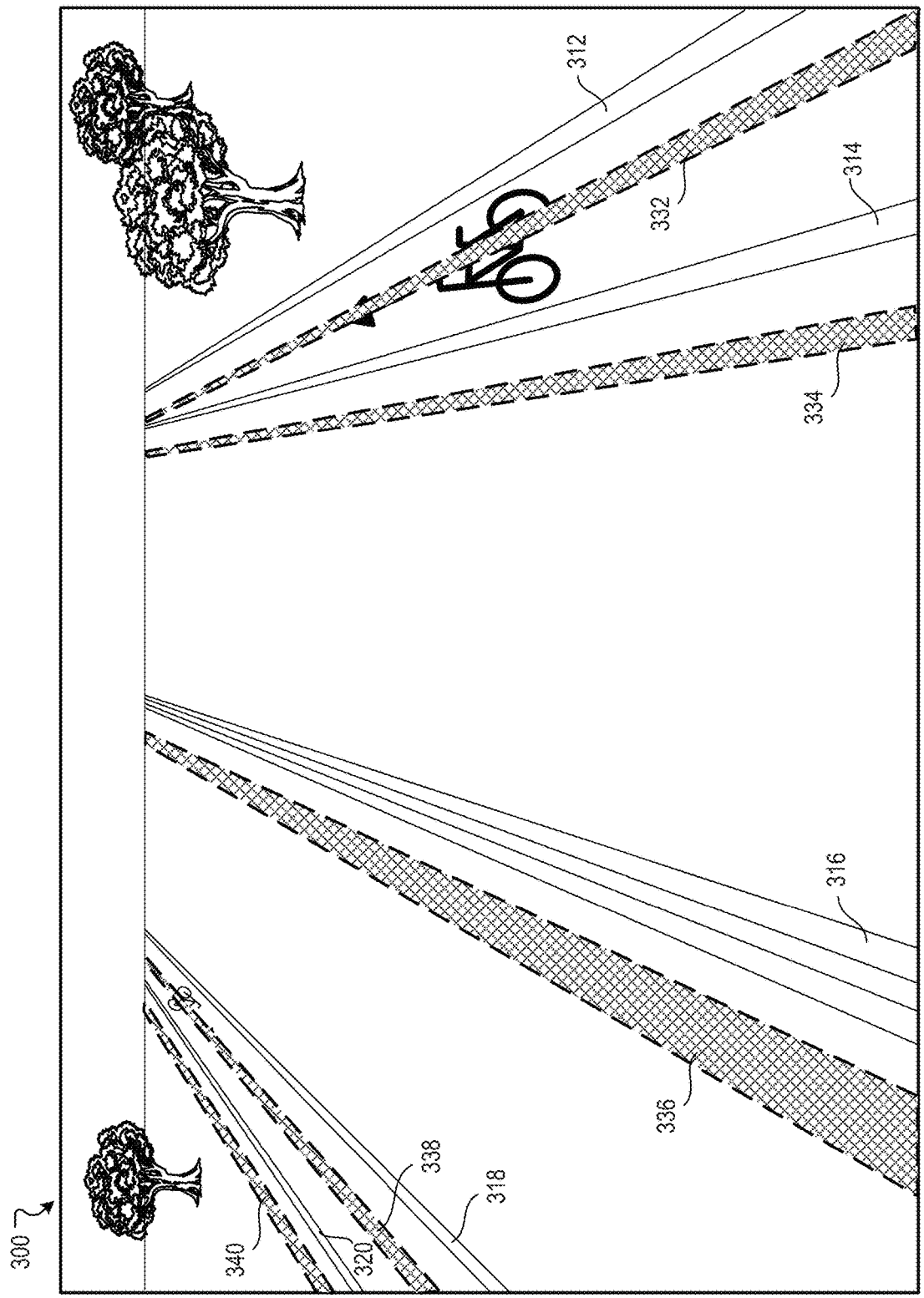

FIGS. 3A-3B illustrate an example scenario that demonstrates generation of semantic position estimates according to an embodiment of the present technology. FIG. 3A depicts an image 300. The image 300 may have been captured by a camera mounted to a vehicle while a lidar system mounted to the vehicle captured lidar data that was used to generate a point cloud and a geometric map. The image 300 may be associated with image location data which can be used to determine a geographic location from which the image was captured. The image 300 may also be associated with camera information describing an angle of view of the camera that captured the first image, the position, orientation, and/or direction of the camera when the first image was captured, and the like. The image 300 depicts lane markers 312, 314, 316, 318, 320 which define two bike lanes 306, 308 and two road lanes 302, 304.

As discussed above, a semantic map may include semantic data which may include, for example, positions of lane markers, stop signs, traffic signals, direction of travel for a particular lane of a road, speed limits, and the like. Furthermore, each piece of semantic data may be associated with semantic data location information which indicates a geographic location for the semantic data. For example, a first piece of semantic data may identify a stop sign, and semantic data location information for the stop sign may indicate a geographic location of the stop sign.

The semantic position estimate module 204, having received image 300, can identify semantic data that corresponds to a geographic location associated with the image based on image location information. For at least some of the semantic data, the semantic position estimate module 204 can generate a semantic position estimate which estimates a position of a particular piece of semantic data within the image 300. In the example in FIG. 3A, the semantic position estimate module 204 may identify semantic data identifying five lane marker segments based on image location information for the image 300. Based on image location information, camera information, and semantic data location information, the semantic position estimate module 204 can estimate where each of the five lane marker segments would appear within the image 300.

In FIG. 3B, the semantic position estimate module 204 has generated five semantic position estimates 332, 334, 336, 338, 340 for each of the five lane marker segments identified in the semantic map. The semantic position estimates 332, 334, 336, 338, 340 correspond to the five lane marker segments 312, 314, 316, 318, 320, respectively. However, due to the fact that the semantic map and the image 300 and/or the geometric map associated with the image 300 may not be perfectly aligned, a semantic position estimate may not perfectly align with the image 300. For example, as can be seen in FIG. 3B, the semantic position estimate 332, which corresponds with the lane marker 312, is not aligned with the lane marker 312. Similarly, the remaining semantic position estimates 334, 336, 338, 340 are also mis-aligned with the physical features they are associated with (i.e., lane markers 314, 316, 318, and 320, respectively). The two-dimensional label module 206 can provide features to correct the positions of the semantic position estimates 332, 334, 336, 338, 340.

Figure 3C:
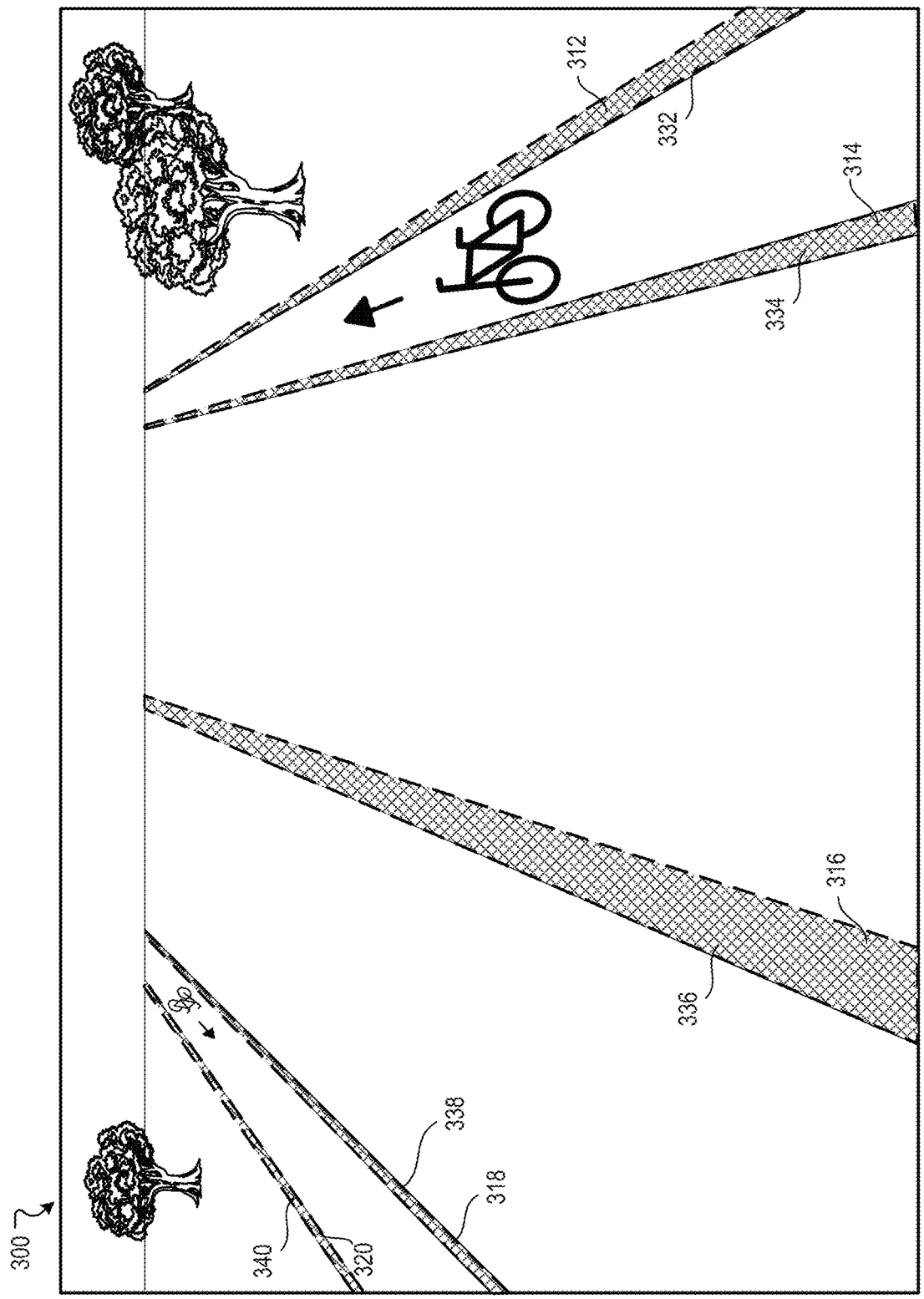

The two-dimensional label module 206 can be configured to modify semantic position estimates (e.g., if semantic position estimates require correction) or confirm semantic position estimates (e.g., if semantic position estimates do not require correction). In an embodiment, correction and/or confirmation of a semantic position estimate may be performed by a user. For example, the two-dimensional label module 206 can provide a user with a user interface in which the user is presented with an image and one or more semantic position estimates overlaid on the image. The user interface may indicate a physical feature the semantic position estimate is associated with. The user can determine whether the semantic position estimate is properly positioned within the image (i.e., whether the semantic position estimate aligns with the associated physical feature in the image). For example, in FIG. 3B, the user can determine whether the semantic position estimate 332 is aligned with its corresponding physical feature, lane marker 312. If the semantic position estimate is properly aligned, the user can confirm the positioning of the semantic position estimate. If the semantic position estimate is not properly aligned, the user can utilize the user interface to adjust or modify the position of the semantic position estimate. For example, in FIG. 3C, the user has adjusted the position of each semantic position estimate 332, 334, 336, 338, 340 (e.g., by clicking and dragging) to align with its corresponding physical feature (i.e., lane markers 312, 314, 316, 318, 320, respectively). The position of each semantic position estimate before confirmation and/or correction (FIG. 3B) can be referred to as an initial position of each semantic position estimate, and the position each semantic position estimate after confirmation and/or correction (FIG. 3C) can be referred to as a final position of each semantic position estimate.

In certain embodiments, the two-dimensional label module 206 may perform correction and/or confirmation of semantic position estimates automatically (e.g., algorithmically). For example, a machine learning model can be trained to identify physical features in an image and where they are positioned within the image. Once physical features in an image are identified, a computing device can adjust the positions of semantic position estimates within the image to align with corresponding physical features. In certain embodiments, manual adjustments of semantic position estimates, as described above, can be used as training data to train a machine learning model to automatically correct and/or confirm semantic position estimates.

Once a final position has been determined for each semantic position estimate in an image (e.g., by correction and/or confirmation), one or more two-dimensional semantic labels can be applied to the image. Two-dimensional semantic labels may accurately identify the position of semantic data within an image. For example, in FIG. 3C, semantic position estimate 332 has been adjusted to align with lane marker 312. As discussed above, semantic data in a semantic map is used to generate semantic position estimates. The semantic map may include a first piece of semantic data which identifies a rightmost lane marker for the stretch of road depicted in the image 300 (i.e., lane marker 312). The finalized position of the semantic position estimate 332 within the image 300 can be used to generate one or more two-dimensional semantic labels which accurately indicate the position of the first piece of semantic data within the image 300. The one or more two-dimensional semantic labels may be represented using any appropriate shape, such as a line segment, a single point, or a collection of points, to indicate the position of the semantic data in the image 300. Two-dimensional semantic labels can be generated for each of the semantic position estimates 332, 334, 336, 338, 340 based on their final positions within the image 300. In certain embodiments, by repeating the steps and processes described above, a plurality of images can be labeled with two-dimensional semantic labels which accurately indicate the positions of semantic data from a semantic map within each image.

The three-dimensional label module 208 can be configured to translate two-dimensional semantic labels in two-dimensional images into three-dimensional semantic labels in a three-dimensional geometric map. As discussed above, each image in a set of two-dimensional images can be tightly coupled to a three-dimensional geometric map. As such, each two-dimensional image can be accurately projected into the three-dimensional geometric map. For example, a first image may be associated with image location information as well as camera information, as described above. The image location information can be used to determine a position within the geometric map from which the image was captured with a high degree of accuracy. Similarly, the camera information associated with the first image (which describes angle of view, camera position, camera orientation, camera direction, etc. when the first image was captured) can be used to determine a view frustum for the first image within the geometric map, and to project two-dimensional positions within the first image into three-dimensional positions in the geometric map.

Figure 4A:
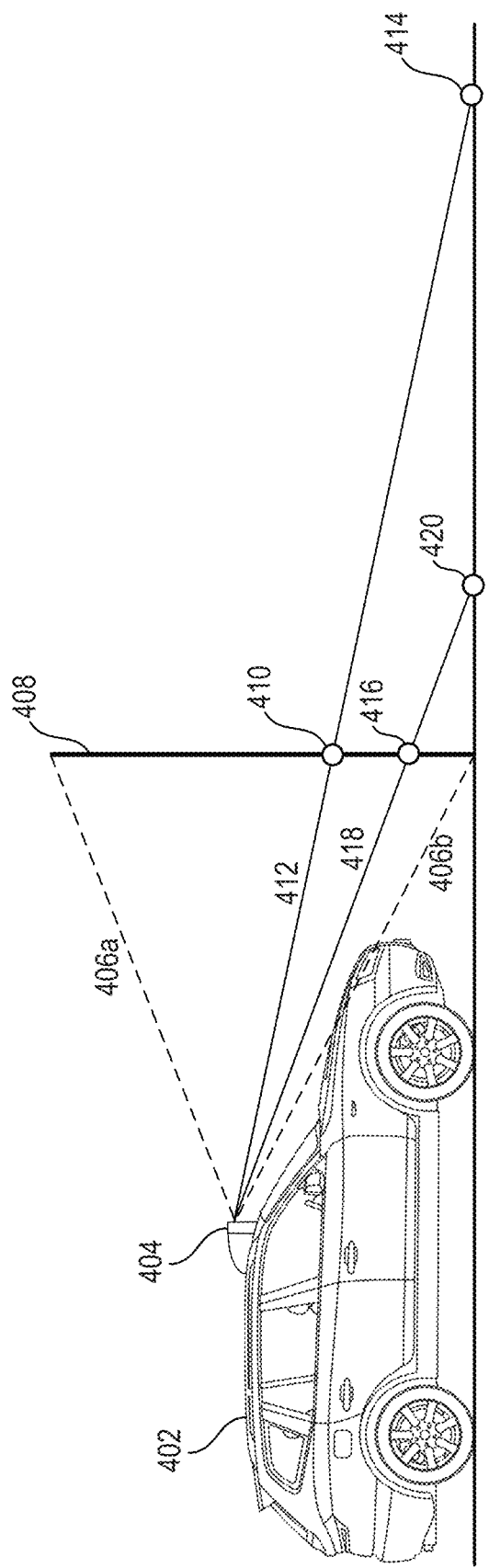
FIG. 4A-B illustrate an example scenario demonstrating translation of two-dimensional labels into three-dimensional labels, according to an embodiment of the present technology.
Figure 4B:
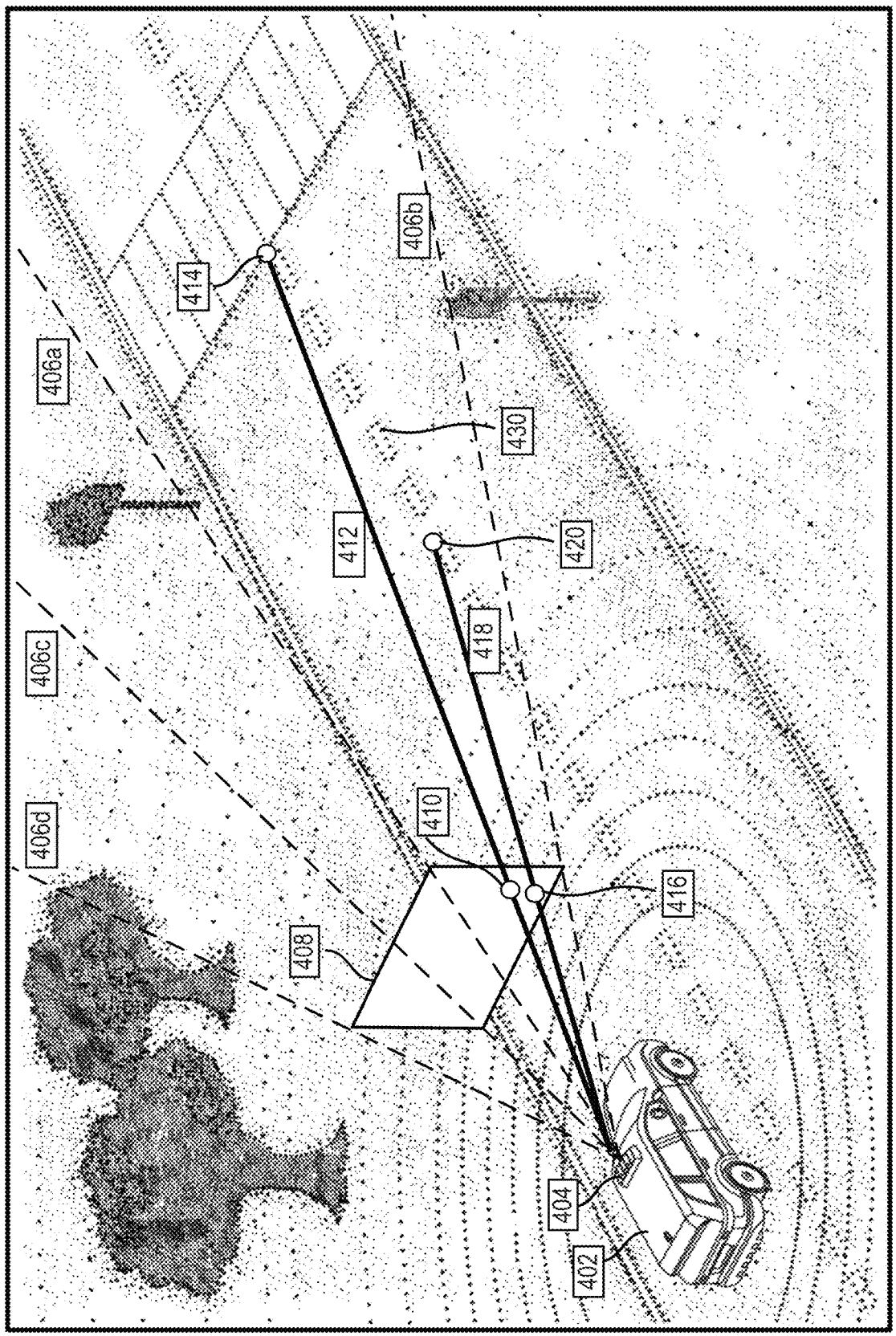

FIGS. 4A and 4B demonstrate an example scenario demonstrating translation of two-dimensional semantic labels in an image to three-dimensional semantic labels in a geometric map. FIG. 4A depicts the example scenario from a side plan view, for simplicity, while FIG. 4B depicts the example scenario from a three-dimensional perspective view for greater detail. FIGS. 4A-B depict a vehicle 402, having a camera 404. The camera is used to capture an image 408. An angle of view of the camera 404 is demonstrated using dotted lines 406a, 406b, 406c, and 406d (lines 406c and 406d are shown only FIG. 4B). The dotted lines 406a-d define a view frustum for the image 408 within the geometric map. The image 408 has two two-dimensional semantic labels 410, 416 applied to it. Since the camera direction, position, and orientation are known when the image 408 was captured, the two-dimensional positions of the two-dimensional semantic labels 410, 416 within the image 408 can be translated into three-dimensional positions in a geometric map. For example, for the two-dimensional semantic label 410, a view ray 412 can be extended from the position of the camera 404 at an angle/direction that corresponds to the two-dimensional position of the semantic label 410 within the image 408. The three-dimensional translation of the two-dimensional semantic label 410 will be positioned somewhere along the view ray 412 within the three-dimensional geometric map. Furthermore, if it is known that the two-dimensional semantic label 410 corresponds to a physical feature on the road surface (e.g., a lane marker), the precise three-dimensional position of the semantic label 410 can be determined based on where the view ray 412 intersects the road surface in the geometric map. In the example shown in FIGS. 4A-B, the view ray 412 intersects the road surface at a point 414. As such, a three-dimensional semantic label can be applied to the geometric map at the point 414. Similarly, for the two-dimensional semantic label 416, a view ray 418 is extended, and the view ray 418 intersects the road surface at a point 420. As such, a three-dimensional semantic label, which corresponds to the two-dimensional semantic label 416, can be applied to the geometric map at the point 420. As discussed above, each two-dimensional semantic label may be associated with semantic data in a semantic map identifying a particular physical feature. Each three-dimensional semantic label corresponds with a two-dimensional semantic label and, therefore, is also associated with the same semantic data as the two-dimensional semantic label. For example, in FIG. 4B, the two-dimensional semantic labels 410, 416 are both associated with a center lane marker 430. The three-dimensional semantic labels at positions 414, 420 indicate the position of the center lane marker 430 within the three-dimensional geometric map. In this way, a geometric map can be populated with a plurality of semantic labels which accurately indicate where various pieces of semantic data from a semantic map are positioned within the geometric map.

As demonstrated above in the example scenario depicted in FIGS. 4A-B, translation of a two-dimensional position in an image to a three-dimensional position within a geometric map may include determining where a view ray intersects a ground or road surface within the geometric map. As such, it may be useful to generate a ground map (e.g., a ground mesh) which represents a ground surface in a geometric map. The three-dimensional label module 208 can be configured to generate a ground map based on point cloud data or any other data used to generate a three-dimensional geometric map. In an embodiment, the ground map may be represented using a height map, and the three-dimensional label module 208 may handle the height map generation as an optimization problem that finds an optimal solution based on a set of constraints. In an embodiment, the set of constraints can include a constraint requiring that a vehicle's wheels must touch the ground surface. Using information about a vehicle that was used to capture data (e.g., point cloud/lidar data) from which a geometric map was generated, the three-dimensional label module 208 can compute wheel positions where the vehicle's wheels should touch the ground, and penalizes the distance between wheel positions and the nearest height value in the ground map. In an embodiment, the set of constraints can include a constraint that enforces a smooth surface by penalizing discontinuities, large slopes, and curvature among neighboring height map cells in order to obtain a smooth surface. In an embodiment, the set of constraints can include a constraint that forces the ground map to fit the point cloud data by penalizing the distance between each point of the point cloud and height values in the ground map. Using a loss function, penalization can be reduced for points that are very far away from the ground map. In an embodiment, the ground map may be determined such that there are no overlapping points in the ground map. In other words, each x and y coordinate in the ground map may be associated with only a single z coordinate (i.e., a single height).

The map warping module 210 can be configured to warp a semantic map based on three-dimensional semantic labels applied to a three-dimensional geometric map. As discussed above, a geometric map may be labeled with a plurality of three-dimensional semantic labels, and each three-dimensional semantic label may be associated with a particular piece (or set) of semantic data contained in a semantic map. As such, the semantic map can be warped such that the semantic data that is identified in the geometric map (via the three-dimensional semantic labels) align with the semantic data contained in the semantic map. The warped semantic map can be overlaid on (e.g., layered on) the geometric map. As a result, a particular position in the geometric map can be used to access geometric, physical features relating to that position as well as relevant semantic data relating to that position within the geometric map.

In an embodiment, the map warping module 210 can handle warping of a semantic map as an optimization problem that finds an optimal solution based on a set of constraints. FIGS. 4C-J illustrate various example constraints that may be implemented to warp the semantic map. While the various examples deal primarily with lane boundaries (i.e., lane markers), it should be understood that the present technology provides many different types of semantic data and many different types of physical features that may be used to warp a semantic map. Furthermore, while the examples deal primarily with three-dimensional semantic labels that are point labels, it should be understood that the present technology provides three-dimensional semantic labels that may take any appropriate shape or form.

Figure 4C:
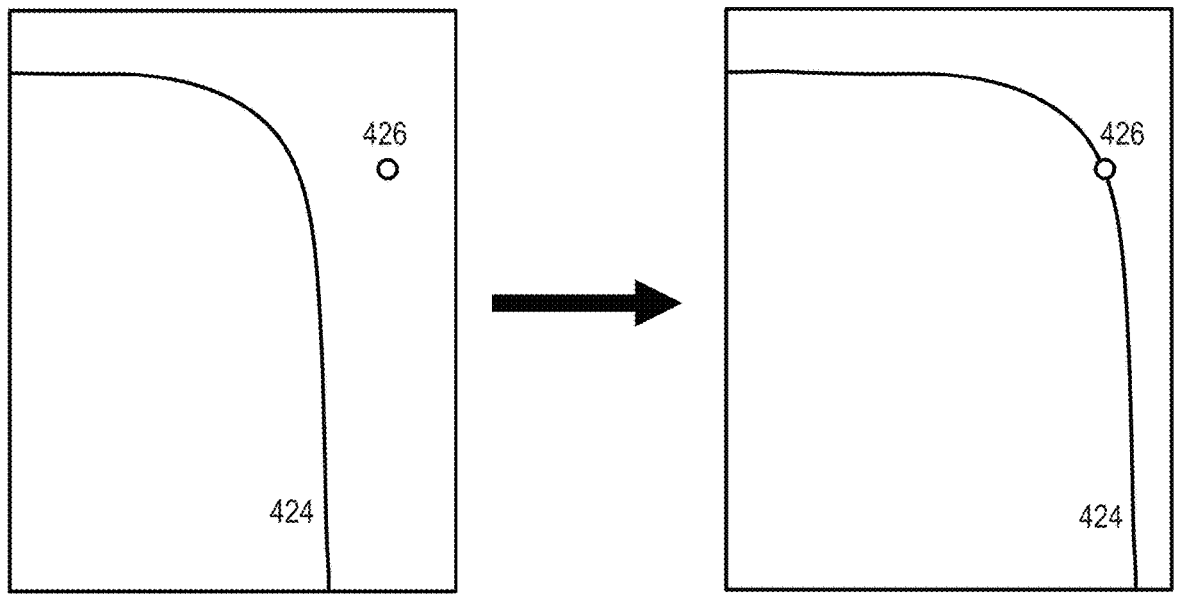
FIGS. 4C-I illustrate various example warping constraints for warping map data, according to various embodiments of the present technology.

In an embodiment, the map warping module 210 may assume that the shape of a generated lane boundary is correct and attempt to preserve it. For example, FIG. 4C shows a lane boundary 424 and a semantic label 426 of a geometric map. The semantic map is warped such that the position of the lane boundary 424 is shifted to overlap the semantic label 426 while maintaining the shape of the lane boundary 424.

Figure 4D:
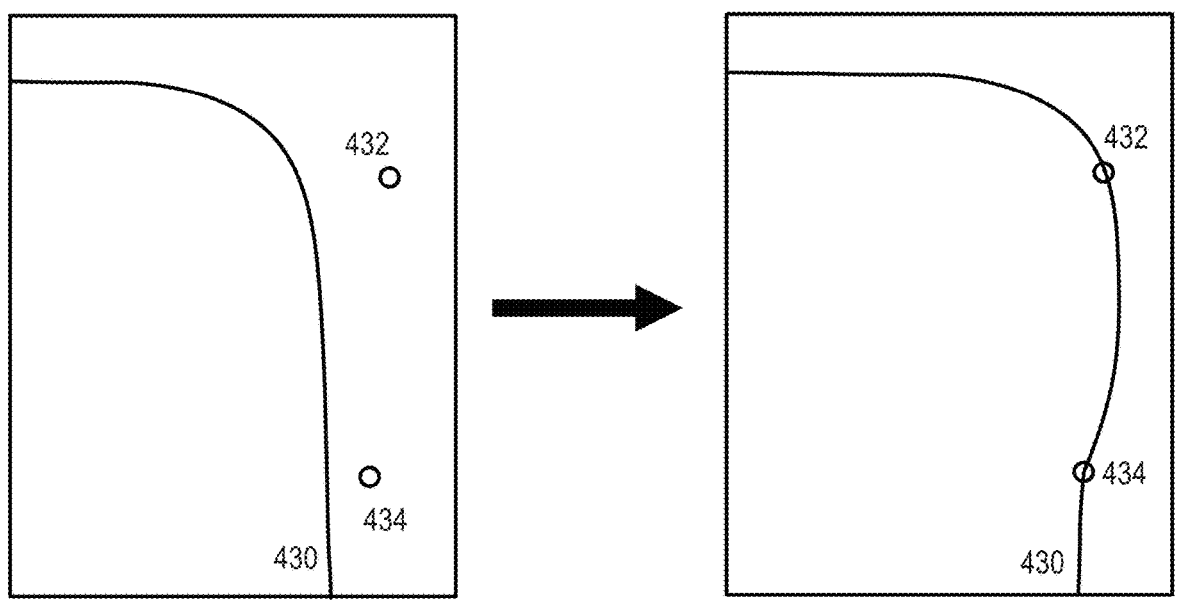

In an embodiment, the set of constraints may include a constraint which requires that every semantic label should be followed as closely as possible. FIG. 4D shows a lane boundary 430, and two semantic labels 432, 434. The semantic map is warped such that the position of the lane boundary 430 is shifted, and the shape of the lane boundary 430 is adjusted to follow the semantic labels 432, 434.

Figure 4E:
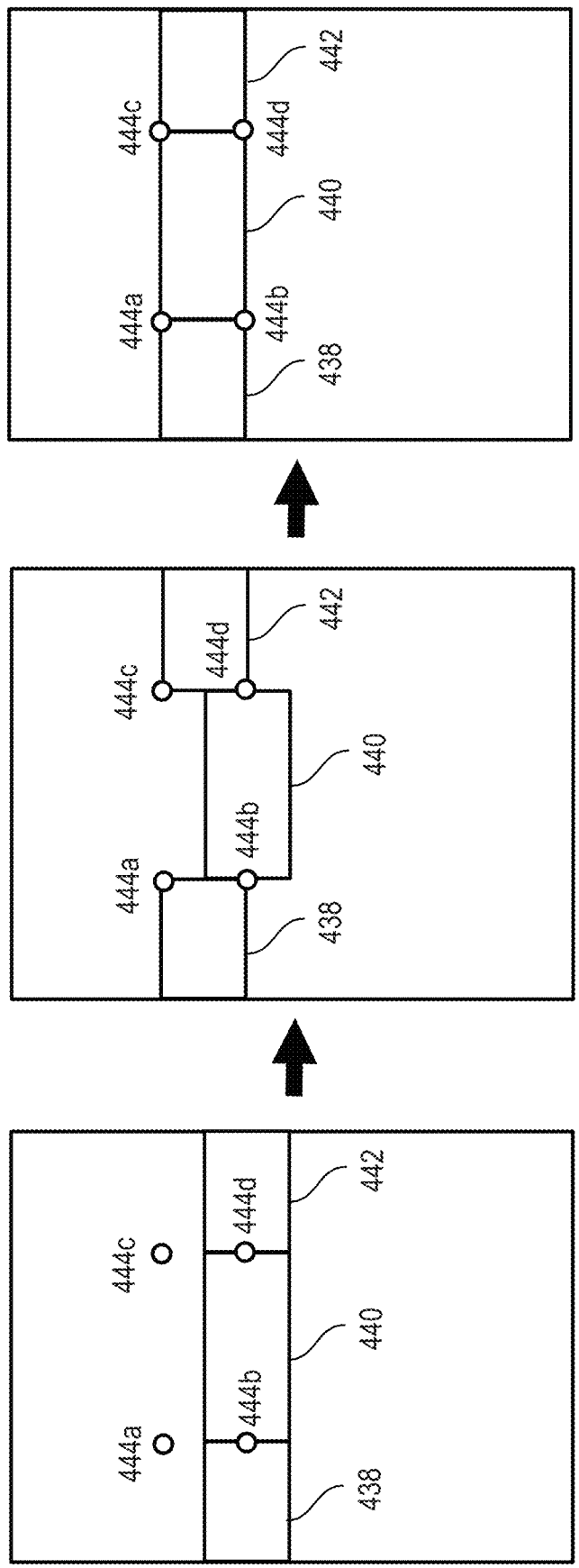

In an embodiment, the set of constraints may include a constraint which requires that each lane is connected without gaps. FIG. 4E illustrates an example in which a lane is divided into three segments 438, 440, 442. Two semantic labels 444a, 444b correspond to the first lane segment 438, and two semantic labels 444c, 444d correspond to the third lane segment 442. In the first frame, it can be seen that the unwarped semantic map does not align with the semantic labels 444a-d. In the middle frame, the first lane segment 438 has been shifted upwards to follow semantic labels 444a, 444b. Similarly, the third lane segment 442 has been shifted upwards to follow semantic labels 444c, 444d. However, shifting of the first and third lane segments 438, 442 has result in a discontinuous lane. In order to cause the lane to be continuously connected without gaps, the second lane segment 440 is shifted up to connect with the shifted first and third lane segments 438, 442.

Figure 4F:
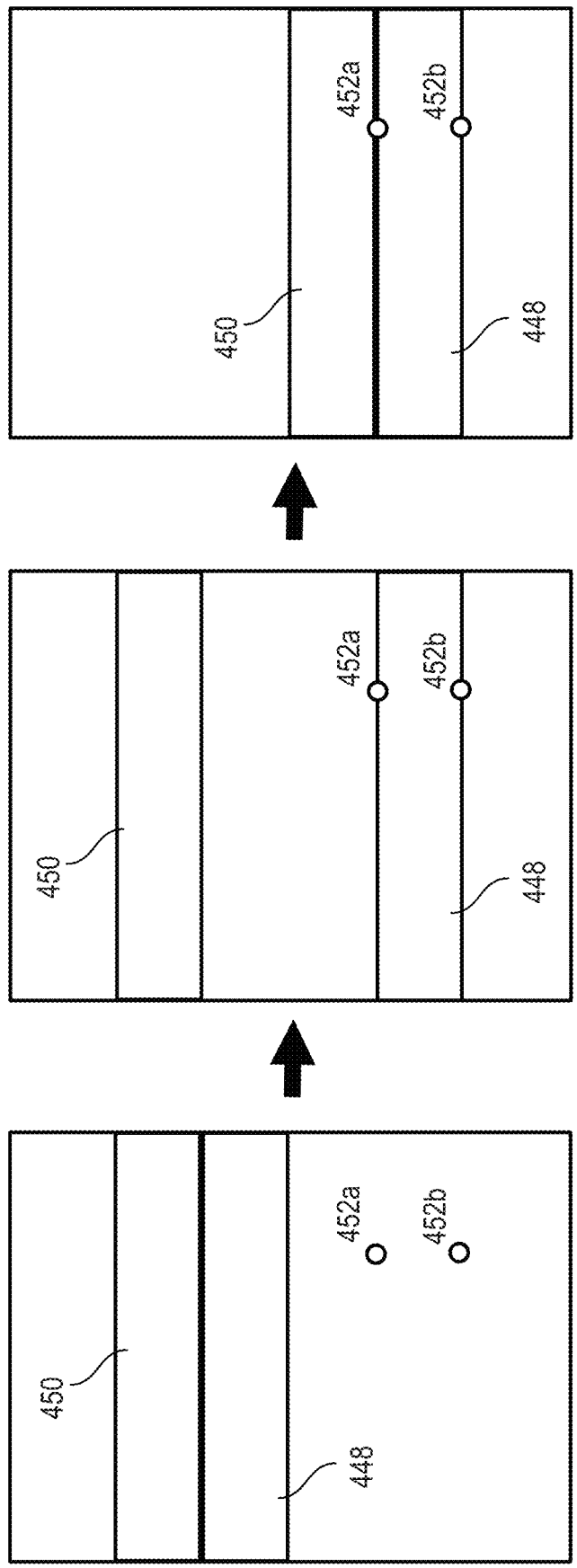
Figure 4G:
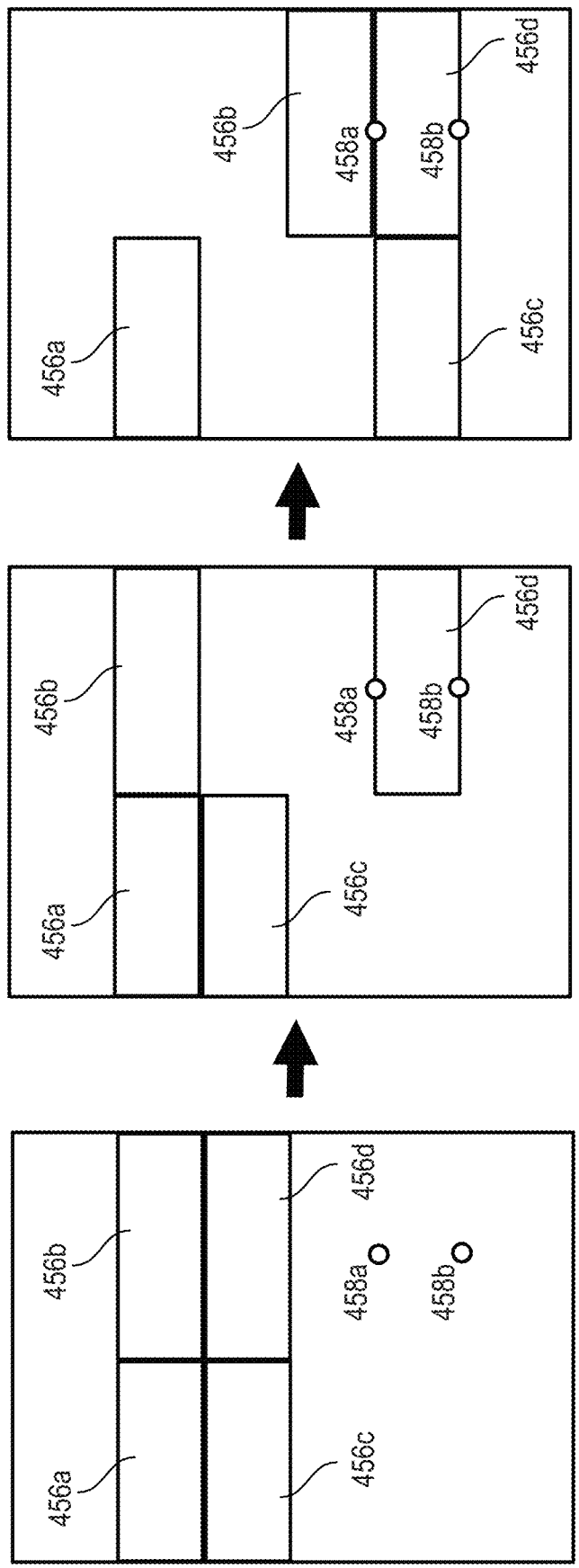

In an embodiment, the set of constraints may include a constraint which requires that unlabeled lanes adjacent to a labeled lane are shifted in parallel with the labeled lane while preserving estimated lane widths. FIG. 4F illustrates an example in which there are two lanes 448, 450. Semantic labels 452a, 452b correspond with the lower lane 448, and the upper lane 450 is unlabeled. In the middle frame, the lower lane 448 is shifted to follow the semantic labels 452a, 452b. In the final frame, the unlabeled upper lane 450 is shifted to be adjacent to and in parallel with the lower lane 448. FIG. 4G illustrates another example in which there are four lane segments 456a, 456b, 456c, 456d. Although there are four lane segments 456a-d, there are only two semantic labels 458a-b, which correspond with the lower right lane segment 456d. As such, lane segment 456d is the only labeled lane segment, and all the other lane segments are unlabeled. In the middle frame, the labeled lane segment 456d is shifted to follow the semantic labels 458a-b. In the final frame, unlabeled lane segments 456b and 456c, which are adjacent to the labeled lane segment 456d, are shifted in parallel with the lane segment 456d. However, unlabeled lane segment 456a is not shifted, because it is not adjacent to a labeled lane segment.

In an embodiment, the set of constraints may include one or more constraints pertaining to lane segment ends. It can be appreciated that a single road lane can extend for many miles. As such, a lane may be partitioned into multiple lane segments. Each lane segment may have a width, typically defined by lane markers on either side of the lane, as well as a length. Lane boundaries which define the length of a lane may be referred to as lane segment ends. In an embodiment, lane segment ends may be represented as two points at the beginning or the end of side lane boundaries. Certain semantic labels may define the positions of side lane boundaries (e.g., the positions of lane markers which define the width of a lane segment), and certain semantic labels may define the positions of lane segment ends (e.g., where a lane segment should begin, and where it should end).

Figure 4H:
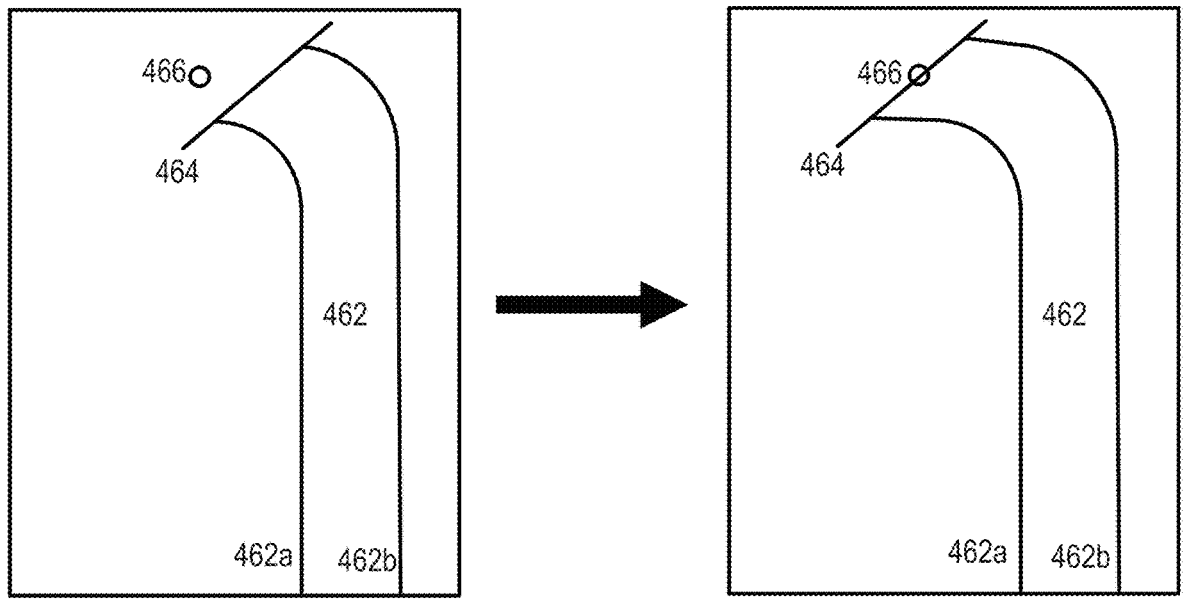
Figure 4I:
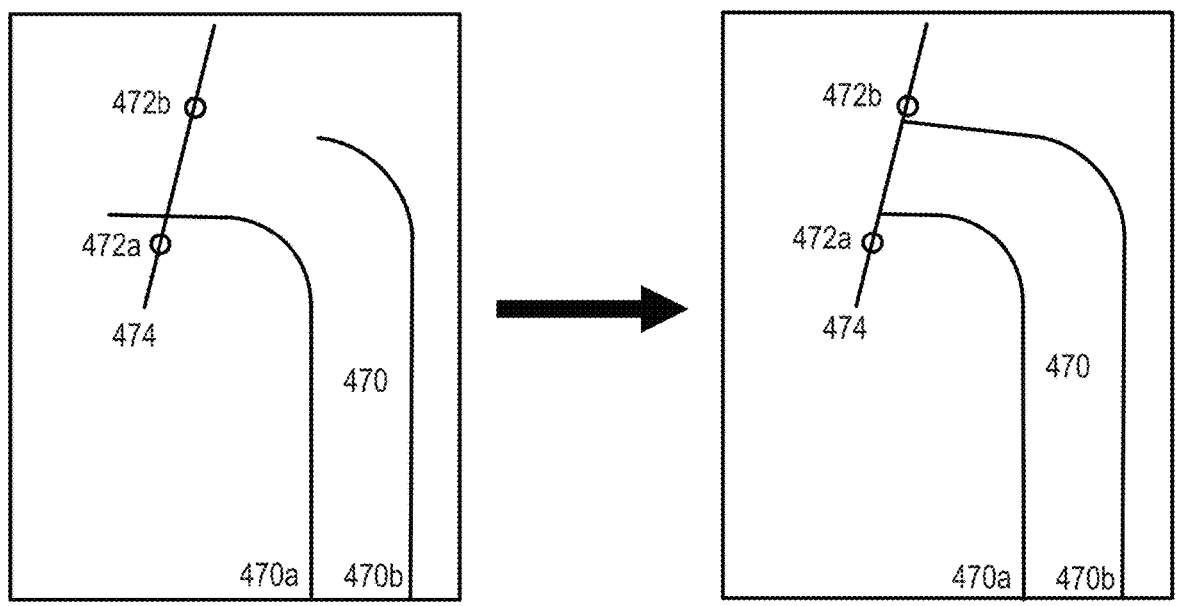

FIGS. 4H-I illustrate example scenarios in which a semantic map is warped to adjust the position of lane segment ends on the positions of semantic labels. In FIG. 4H, the position of a lane segment end is defined using a single semantic label, while in FIG. 4I, the position of a lane segment end is defined using two semantic labels.

In FIG. 4H, the width of a lane segment 462 is defined by side boundaries 462a, 462b, and the lane segment ends at a lane segment end 464. However, the lane segment end 464 does not align with a semantic label 466. As such, the side boundaries 462a, 462b are extended such that the lane segment end 464 follows the semantic label 466, while maintaining the shape/angle of the lane segment end 464.

In FIG. 4I, the width of a lane segment 470 is defined by side boundaries 470a, 470b. In this example, two semantic labels 472a, 472b define a desired lane segment end 474. Since there two semantic labels 472a, 472b in this case, the two semantic labels can define a line, and the side boundaries 470a, 470b can be individually adjusted to conform with the lane segment end line 474. In this example, the side boundary 470a is cut off to end at the lane segment end 474, and the side boundary 470b is extended to the lane segment end 474.

While certain constraints for warping a semantic map are demonstrated above, it should be understood that these are provided only by way of example, and many other variations are possible without departing from the scope of the present technology.

Figure 5:
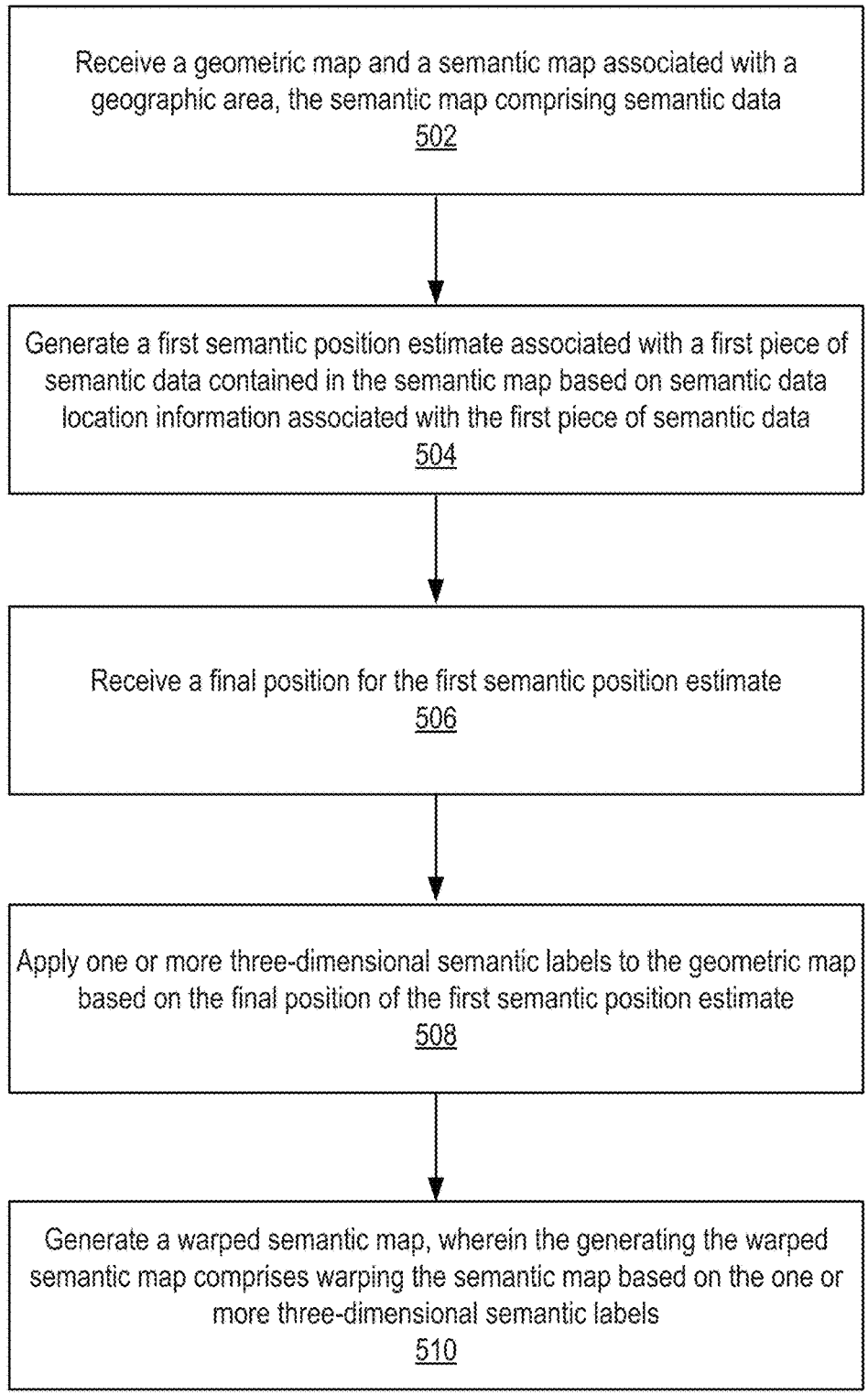
FIG. 5 illustrates an example method, according to an embodiment of the present technology.

FIG. 5 illustrates an example method 500, according to an embodiment of the present technology. At block 502, the example method 500 can receive a geometric map and a semantic map associated with a geographic area, the semantic map comprising semantic data. At block 504, the example method 500 can generate a first semantic position estimate associated with a first piece of semantic data contained in the semantic map based on semantic data location information associated with the first piece of semantic data. At block 506, the example method 500 can receive a final position for the first semantic position estimate. At block 508, the example method 500 can apply one or more three-dimensional semantic labels to the geometric map based on the final position of the first semantic position estimate. At block 510, the example method 500 can generate a warped semantic map, wherein the generating the warped semantic map comprises warping the semantic map based on the one or more three-dimensional semantic labels.

Many variations to the example method are possible. It should be appreciated that there can be additional, fewer, or alternative steps performed in similar or alternative orders, or in parallel, within the scope of the various embodiments discussed herein unless otherwise stated.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules shown in FIG. 2 may be implemented by one or more computing systems of the transportation management system 660. In some embodiments, some or all modules shown in FIG. 2 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
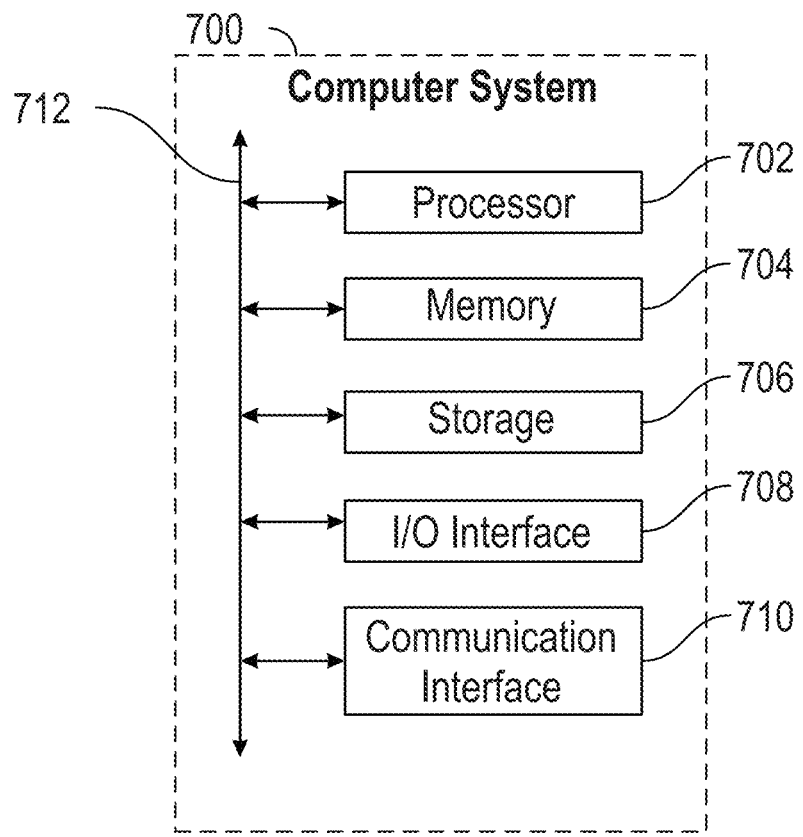
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   receiving, by a computing system, a geometric map and a semantic map associated with a geographic area, the semantic map including semantic data associated with vehicle navigation;
   generating, by the computing system, a semantic position estimate based on a portion of the semantic data associated with an object, wherein the portion of the semantic data is included in the semantic map;
   receiving, by the computing system, an updated position of the semantic position estimate based on aligning the semantic position estimate with one or more corresponding physical features associated with the object in the geometric map;
   applying, by the computing system, one or more three-dimensional semantic labels to the geometric map based on the updated position of the semantic position estimate; and
   generating, by the computing system, a warped semantic map, wherein the generating the warped semantic map is based on the one or more three-dimensional semantic labels.

2. The computer-implemented method of claim 1, further comprising generating one or more two-dimensional semantic labels that indicate a position of the portion of the semantic data in an image associated with the geometric map based on the updated position of the semantic position estimate.

3. The computer-implemented method of claim 1, wherein the semantic position estimate is applied to a first image of a set of images associated with the geometric map, and subsequently, used to estimates a position of the portion of the semantic data within the first image.

4. The computer-implemented method of claim 3, wherein the receiving the updated position of the semantic position estimate comprises:
   receiving an updated two-dimensional position of the semantic position estimate of the first image.

5. The computer-implemented method of claim 4, wherein the receiving the updated position of the semantic position estimate comprises:
   receiving a user input adjusting a position of the semantic position estimate of the first image.

6. The computer-implemented method of claim 4, further comprising:
   applying one or more three-dimensional semantic labels to the geometric map based on the updated position of the semantic position estimate, wherein the applying the one or more three-dimensional semantic labels comprises determining a region where a view ray associated with the first image intersects a surface in the geometric map, wherein the one or more three-dimensional semantic labels are applied to the geometric map based on the region where the view ray intersects the surface.

7. The computer-implemented method of claim 4, wherein the applying one or more three-dimensional semantic labels to the geometric map based on the updated position of the semantic position estimate comprises translating the updated two-dimensional position of the semantic position estimate of the first image into a three-dimensional position within the geometric map.

8. The computer-implemented method of claim 7, wherein the updated two-dimensional position of the semantic position estimate within the first image is translated into a three-dimensional position within the geometric map based on image location information associated with the first image and camera information associated with the first image, wherein the camera information comprises camera position, orientation, and direction information for a camera when the first image was captured.

9. The computer-implemented method of claim 1, wherein the generating the warped semantic map is performed as an optimization problem that warps the semantic map based on a set of constraints.

10. The computer-implemented method of claim 1, wherein the semantic data includes at least one of a position of a lane marker, an orientation of the lane marker, a position of a boundary, an orientations of the boundary, a lane direction, a speed limit, or a position of a road feature.

11. A system comprising:
   at least one processor; and
   a memory storing instructions that, when executed by the at least one processor, cause the system to perform:
      receiving a geometric map and a semantic map associated with a geographic area, the semantic map including semantic data associated with vehicle navigation;
      generating a semantic position estimate based on a portion of the semantic data associated with an object, wherein the portion of the asemantic data is included in the semantic map;
      receiving an updated position of the semantic position estimate based on aligning the semantic position estimate with one or more corresponding physical features associated with the object in the geometric map;
      applying one or more three-dimensional semantic labels to the geometric map based on the updated position of the semantic position estimate; and
      generating a warped semantic map, wherein the generating the warped semantic map is based on the one or more three-dimensional semantic labels.

12. The system of claim 11, wherein the instructions, when executed by the at least one processor, further cause the system to perform:
   generating one or more two-dimensional semantic labels that indicate a position of the portion of the semantic data in an image associated with the geometric map based on the updated position of the semantic position estimate.

13. The system of claim 11, wherein the semantic position estimate is applied to a first image of a set of images associated with the geometric map, and subsequently, used to estimates a position of the portion of the semantic data within the first image.

14. The system of claim 13, wherein the receiving the updated position of the semantic position estimate comprises:
   receiving a final two-dimensional position of the semantic position estimate of the first image.

15. The system of claim 14, wherein the receiving the updated position of the semantic position estimate comprises:
   receiving a user input adjusting a position of the semantic position estimate of the first image.

16. A non-transitory computer-readable storage medium including instructions that, when executed by at least one processor of a computing system, cause the computing system to perform:
   receiving a geometric map and a semantic map associated with a geographic area, the semantic map including semantic data associated with vehicle navigation;
   generating a semantic position estimate based on a portion of the semantic data associated with an object, wherein the portion of the semantic data is included in the semantic map;
   receiving an updated position of the semantic position estimate based on aligning the semantic position estimate with one or more corresponding physical features associated with the object in the geometric map;
   applying one or more three-dimensional semantic labels to the geometric map based on the updated position of the semantic position estimate; and
   generating a warped semantic map, wherein the generating the warped semantic map is based on the one or more three-dimensional semantic labels.

17. The non-transitory computer-readable storage medium of claim 16, wherein the instructions, when executed by the at least one processor of the computing system, further cause the computing system to perform:
   generating one or more two-dimensional semantic labels that indicate a position of the portion of the semantic data in an image associated with the geometric map based on the updated position of the semantic position estimate.

18. The non-transitory computer-readable storage medium of claim 16, wherein the semantic position estimate is applied to a first image of a set of images associated with the geometric map, and subsequently, used to estimates a position of the portion of the semantic data within the first image.

19. The non-transitory computer-readable storage medium of claim 18, wherein the receiving the updated position of the semantic position estimate comprises:
   receiving an updated two-dimensional position of the semantic position estimate of the first image.

20. The non-transitory computer-readable storage medium of claim 19, wherein the receiving the updated position of the semantic position estimate comprises:
   receiving a user input adjusting a position of the semantic position estimate within the first image.

* * * * *